R. F. DOBSON.
Weighing-Scales.

No. 226,046 Patented Mar. 30, 1880.

UNITED STATES PATENT OFFICE.

ROBERT F. DOBSON, OF DARLINGTON, WISCONSIN, ASSIGNOR TO HIMSELF AND JOSHUA WHARRIE, OF SAME PLACE.

WEIGHING-SCALES.

SPECIFICATION forming part of Letters Patent No. 226,046, dated March 30, 1880.

Application filed January 20, 1880.

*To all whom it may concern:*

Be it known that I, ROBERT F. DOBSON, of Darlington, in the county of La Fayette and State of Wisconsin, have invented a new and useful Improvement in Weighing-Scales; and I do hereby declare that the following is a full, clear, and exact description of the same, reference being had to the accompanying drawings, forming part of this specification, in which—

Figure 1:
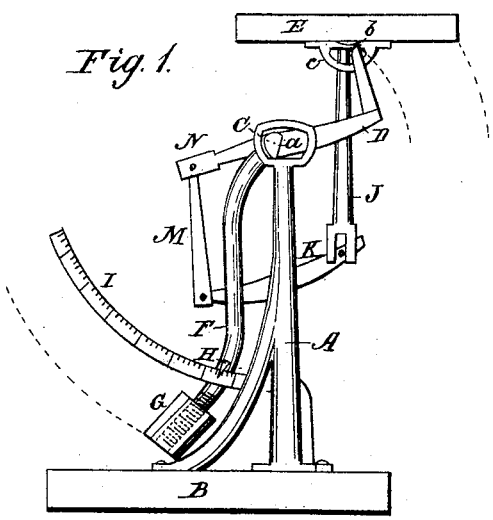
Figure 2:
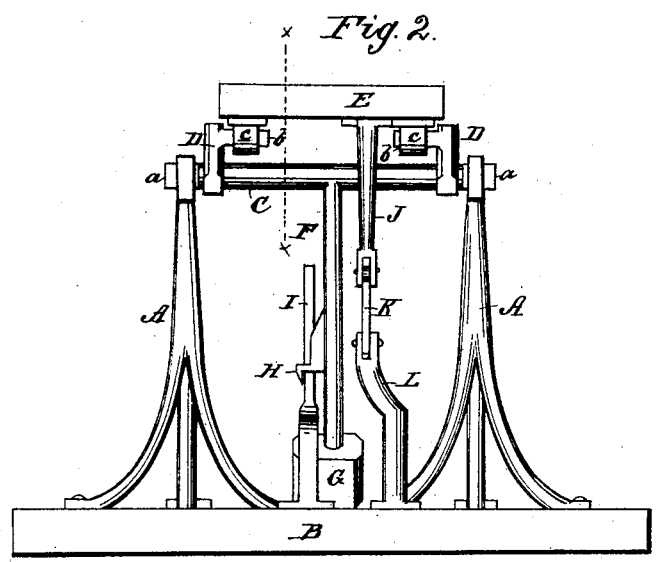
Figure 3:
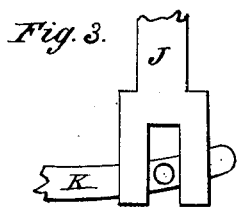

Figure 1 is a side view. Fig. 2 is a front view. Fig. 3 is an enlarged detail of the connection between the pendent bar from the platform and its lever.

My invention relates to certain improvements in that class of weighing-scales in which the weight of the object to be weighed is made to deflect a lever over a curved scale-bar and throw a weight carried by said lever into a position approaching more nearly the horizontal, in which the leverage of said weight is greater.

The invention consists, first, in a rock-shaft mounted upon knife-edges in suitable standards, and having on one side two arms projecting at right angles and provided with knife-edges, upon which the platform is mounted, and upon the opposite side an arm or lever carrying the weight and a pointer adapted to pass over a circular scale as the weight rises.

It also further consists in the peculiar means for sustaining the platform in a horizontal position and equalizing the weighing effect upon all parts of the platform, as hereinafter fully described.

In the drawings, A A represent two standards, fixed firmly upon a basic support, B. Through holes in the ends of these standards project the ends of a rock-shaft, C, which ends are formed with knife-edges $a$, which rest upon smooth seats in the holes of the standards. Upon one side of this rock-shaft there project at right angles and in a nearly horizontal position the two arms D D, which at their extremities have an upward bend carrying inwardly-projecting knife-edges $b$, whose edges point upwardly. Inclosing these knife-edges and mounted upon the same are the brackets $c$, which are fastened to the under side of the platform E.

Upon the opposite side of the rock-shaft from the arms D, and depending in a nearly vertical position, is the curved arm or lever F, carrying at its end the weight G, which is screwed upon the end of said arm, so as to be adjustable in balancing the platform. This arm also carries a pointer or index-hand, H, which, as the arm rises from the weight on the platform, passes over the circular and graduated scale-bar I, fixed to the base-piece.

In constructing the knife-edges $a$ of the rock-shaft they are made round on one side and straight on the other, and they are formed by filing away the semi-circumference of the shaft, of which shape the flat or straight side turns down toward the surface upon which it is supported. The knife-edges $b$, which support the platform, are constructed in a similar manner for the same purpose, but point upwardly. Their flat sides, however, always turn toward their bearing-surfaces.

For sustaining the platform in a horizontal position and equalizing the weighing effect upon all parts of the same, I employ a peculiar construction of parts.

Heretofore it has been customary to provide the platform with a pendent rod, J, jointed below to a horizontal link, to hold the platform in a horizontal position. With this construction, however, if the object to be weighed was placed upon the outer or remote edge of the platform, it added to the leverage and caused the article to indicate a greater weight than it should, for it gave a tendency to the platform to rock on its knife-edges $b\ b$, and this tendency being resisted by the friction of the lower end of rod J against its link, the platform was to that extent rigidly connected with its supporting-arms, and only a central position of the weight on the platform would give constant results.

I connect the lower end of bar J loosely with a lever, K, fulcrumed at its middle upon an upright, L, and its other end I connect by a link-rod, M, with an arm, N, projecting from the rock-shaft. In making the connection between the bar J and the lever K said bar is not jointed thereto, but is simply forked and made to embrace a cross-pin or a T-shaped head of said lever, so that no part of the weight is borne by this end of the le-
bar J is simply held against lat-
...ation by its forks embracing the T-
head. By this construction, it will be
the weight on the platform is transmitted
...irely through the arms D to the rock-shaft,
and the latter being tilted, the arm N is made
to lift rod M, and that this end of the lever K
is also directly lifted. As, therefore, the plat-
form descends, the end of the lever connecting
with bar J also descends without any weight
from the platform being transmitted thereto.
This serves always to hold the platform in a
horizontal position, but obviates the friction
at this joint, which involves the variation in
the weighing function of the device before de-
scribed.

Having thus described my invention, what I claim as new is—

1. The rock-shaft C, having knife-edges, and two arms, D D, extended at right angles and then bent upwardly, and provided with knife-edges, and a pendent arm, F, with a weight on the opposite sides, in combination with the platform, the supporting-standards, and the curved scale-bar, as shown and described.

2. The combination, with a pendent bar, J, of a pair of scales, of a lever fulcrumed near its middle and loosely coupled to said pendent bar, for holding it in a vertical position and the platform horizontal, but deriving its motion directly from the main working-lever of the scales, as and for the purpose described.

ROBERT F. DOBSON.

Witnesses:
JAS. H. GRAY,
C. F. OSBORN.